United States Patent
Pond et al.

(10) Patent No.: US 10,294,050 B2
(45) Date of Patent: May 21, 2019

(54) TWO STAGE MEDIA SEPARATOR

(71) Applicant: NCR Organization, Duluth, GA (US)

(72) Inventors: Christopher H. Pond, Peterborough (CA); Jason M. Gillier, Waterloo (CA); Matthew Sonnenberg, Kitchener (CA)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/927,684

(22) Filed: Oct. 30, 2015

(65) Prior Publication Data
US 2017/0121135 A1 May 4, 2017

(51) Int. Cl.
*B65H 3/06* (2006.01)
*G06Q 20/00* (2012.01)
*B65H 5/00* (2006.01)
*B65H 3/68* (2006.01)
*B65H 3/56* (2006.01)
*G06Q 20/18* (2012.01)
*G06Q 20/10* (2012.01)
*G06Q 20/20* (2012.01)
*B65H 3/52* (2006.01)

(52) U.S. Cl.
CPC .............. *B65H 3/06* (2013.01); *B65H 3/5261* (2013.01); *B65H 3/5284* (2013.01); *B65H 3/56* (2013.01); *B65H 3/68* (2013.01); *B65H 5/006* (2013.01); *G06Q 20/1085* (2013.01); *G06Q 20/18* (2013.01); *G06Q 20/20* (2013.01); *B65H 2301/3123* (2013.01); *B65H 2404/50* (2013.01); *B65H 2404/6111* (2013.01); *B65H 2701/1912* (2013.01)

(58) Field of Classification Search
CPC ........ B65H 3/06; B65H 3/68; B65H 2404/50; B65H 2301/3112; B65H 2301/3123; B65H 5/068
See application file for complete search history.

(56) References Cited

U.S. PATENT DOCUMENTS

| | | | | |
|---|---|---|---|---|
| 4,934,684 | A * | 6/1990 | Gysling | B65H 1/18 271/121 |
| 5,044,622 | A * | 9/1991 | Cattin | B65H 3/06 271/121 |
| 6,102,389 | A * | 8/2000 | Sakurai | B65H 3/5223 271/121 |
| 8,118,304 | B1 * | 2/2012 | Chen | B65H 3/0684 271/245 |
| 9,242,817 | B2 * | 1/2016 | Suganuma | B65H 5/36 |
| 2003/0146560 | A1 * | 8/2003 | Tan | B65H 3/0684 271/10.11 |
| 2007/0063420 | A1 * | 3/2007 | Seike | B65H 3/06 271/109 |

(Continued)

*Primary Examiner* — Patrick Cicchino
(74) *Attorney, Agent, or Firm* — Schwegman, Lundberg & Woessner

(57) ABSTRACT

A stack of media items are urged along a transport path that includes a bend in the track of the transport path. A first phase of separating the media items from the stack includes pre-separating the media items from the stack as the media items are urged along the bend. A second phase includes separating a leading media item from the stack by urging the leading media item exiting the first phase between opposing rollers to transport the leading media item along the transport path within a value media depository.

19 Claims, 7 Drawing Sheets

(56) References Cited

U.S. PATENT DOCUMENTS

| | | | |
|---|---|---|---|
| 2010/0295234 A1* | 11/2010 | Liu | B65H 3/06 271/8.1 |
| 2014/0084531 A1* | 3/2014 | Fukumoto | B65H 3/06 271/10.1 |
| 2014/0238814 A1* | 8/2014 | You | B65H 3/0607 194/206 |
| 2014/0239573 A1* | 8/2014 | Akai | B65H 3/06 271/109 |
| 2014/0292173 A1* | 10/2014 | Kawauchi | B65H 3/06 312/326 |

* cited by examiner

TWO STAGE MEDIA SEPARATOR

BACKGROUND

Currency dispensers or depositories generally include note separators to separate stacks of notes before being processed by the device for either depositing within the depository or withdrawing the notes from the dispenser.

Typically, bunches of notes or stacks experience difficulty during separation within the depositories or dispensers. This can occur for a variety of reasons. For example, the notes may be too crisp or too limp. Crisp notes pose a particular problem during separation within a currency depository of dispenser because crisp notes, such as checks experience a high degree of friction between sheets of the checks. Furthermore, because these checks are smooth and undamaged, rollers and belts used to separate the stack of checks struggle with gripping individual checks.

In addition to new checks, depository or dispenser separation equipment must also effectively deal with poor quality currency, which is typically very limp and folds or crumples easily in transport within the depository or dispenser.

The challenge within a depository is to pull a single note or bill off of a stack being processed within the depository without damaging the remaining notes or bills in the stack.

Existing note separators rely on a single stage process that utilizes a set of offset rollers that pinch the notes or bills driving the bottom note or bill forward while hold the rest of the stack of notes or bills back. But this one stage process is not effective with stacks of notes and bills that have higher inter-note bonds within the stack, such as with new, smooth, and crisp notes or bills and such as with limp or damaged notes or bills.

SUMMARY

In various embodiments, a value media depository and methods for a two-stage media separation of media stacks within the value media depository are provided.

According to an embodiment, a value media depository is provided. The value media depository includes a first separator apparatus and a second separator apparatus. The first separator apparatus includes a first portion of a track that bends at an end of that first portion of the track. The second separator apparatus includes a second portion of the track that begins following the bend and the end of the first portion of the track. The first separator apparatus configured for performing a first phase a media separation and the second separator apparatus configured for performing a second phase of media separation from a stack of media items being processed at an infeed mouth of the value media depository. Moreover, when the stack of media items are urged along the first portion of track, the media items are fanned out exposing a first leading media item to be presented first to the second separator apparatus.

DETAILED DESCRIPTION

Figure 1A:
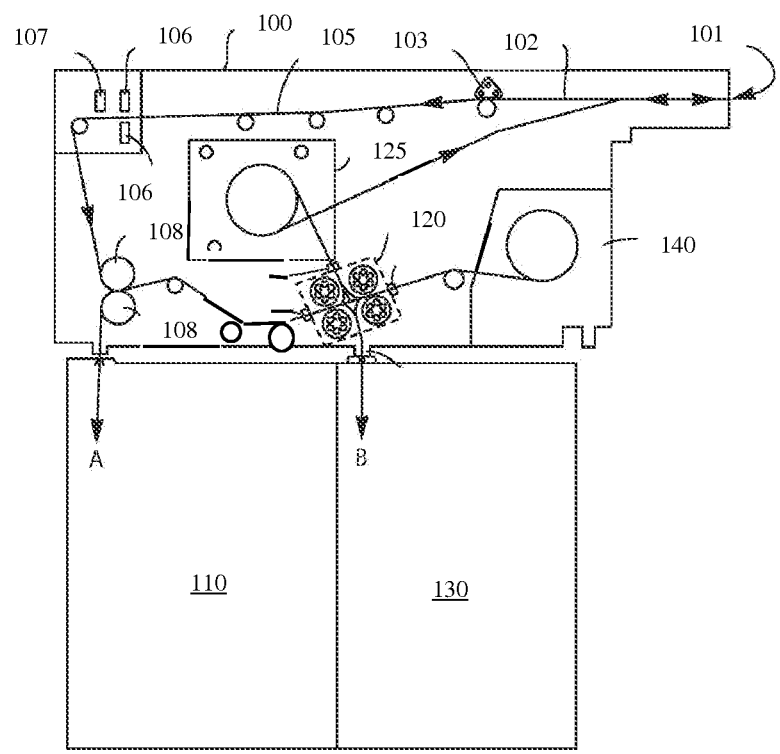
FIG. 1A is a diagram depicting a deposit module of a Self-Service Terminal having a two-phase media separator, according to an example embodiment.

FIG. 1A is a diagram depicting a one-sided view of a pick module for a value media depository 100, according to an example embodiment. It is to be noted that the value media depository is shown with only those components relevant to understanding what has been added and modified to a conventional depository for purposes of providing a novel two-phase media separation within the depository 100.

FIG. 1A illustrates a deposit module 100 (value media depository) suitable for use within an Automated Teller Machine, which can be utilized to process deposited banknotes and checks (value media as a mixed bunch if desired). The deposit module 100 has an access mouth 101 through which incoming checks and/or banknotes are deposited or outgoing checks and/or banknotes are dispensed. This mouth 101 is aligned with an infeed aperture in the ATM, which thus provides an input/output slot. A bunch (stack) of one or more items (value media) is input or output. Incoming checks and/or banknotes follow a first transport path 102 away from the mouth 101 in a substantially horizontal direction from right to left shown in the FIG. 1A. They then pass through a novel two-phase feeder/separator 203 (discussed in detail below with reference to the FIGS. 1B-1D) and along another pathway portion 105, which is also substantially horizontal and right to left. The items are then de-skewed and read by imaging cameras 106 and a Magnetic Ink Character Recognition (MICR) reader 107.

Items are then are directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks and/or banknotes to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "value media" refers to media of value, such as currency, coupons, checks, negotiable instruments, value tickets, and the like.

For purposes of the discussions that follow with respect to the FIGS. 1A-1D, "value media" is referred to as currency and the "value media depository" is referred to as a "depository." Additionally, value media may be referred to as a "document" herein.

Figure 1B:
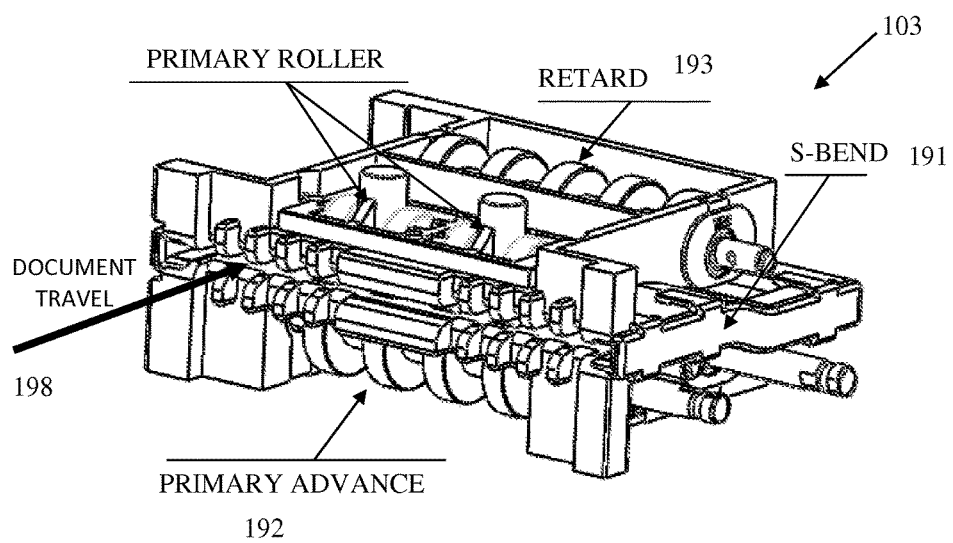
FIG. 1B is a diagram depicting a front view of the two-phase media separator from the FIG. 1A, according to an example embodiment.
Figure 1C:
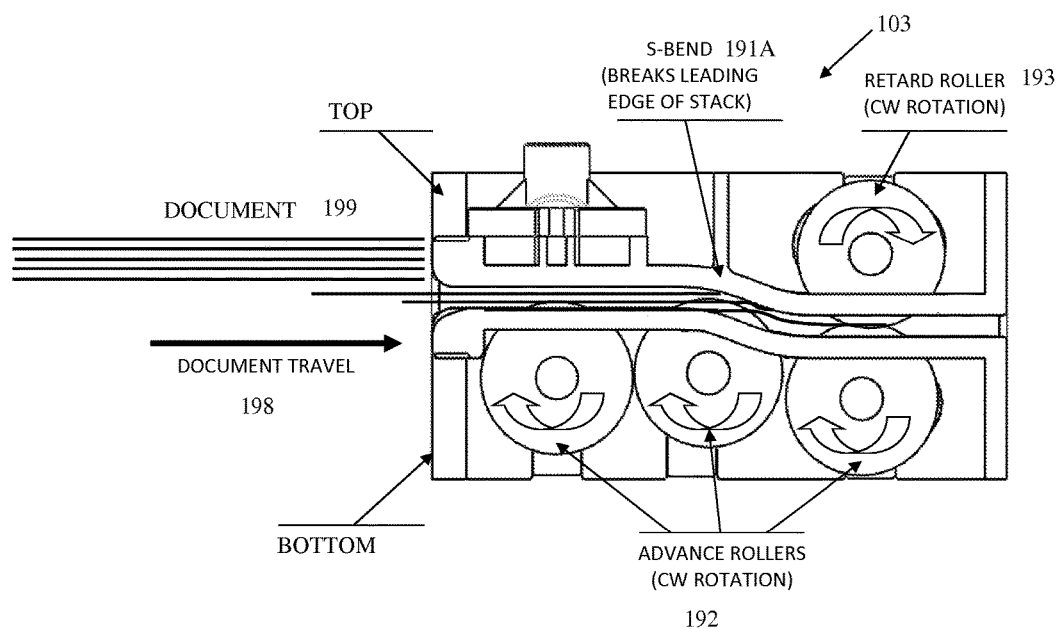
FIG. 1C is a diagram depicting a side view of a downward s-bend in the two-phase media separator from the FIG. 1B, according to an example embodiment.
Figure 1D:
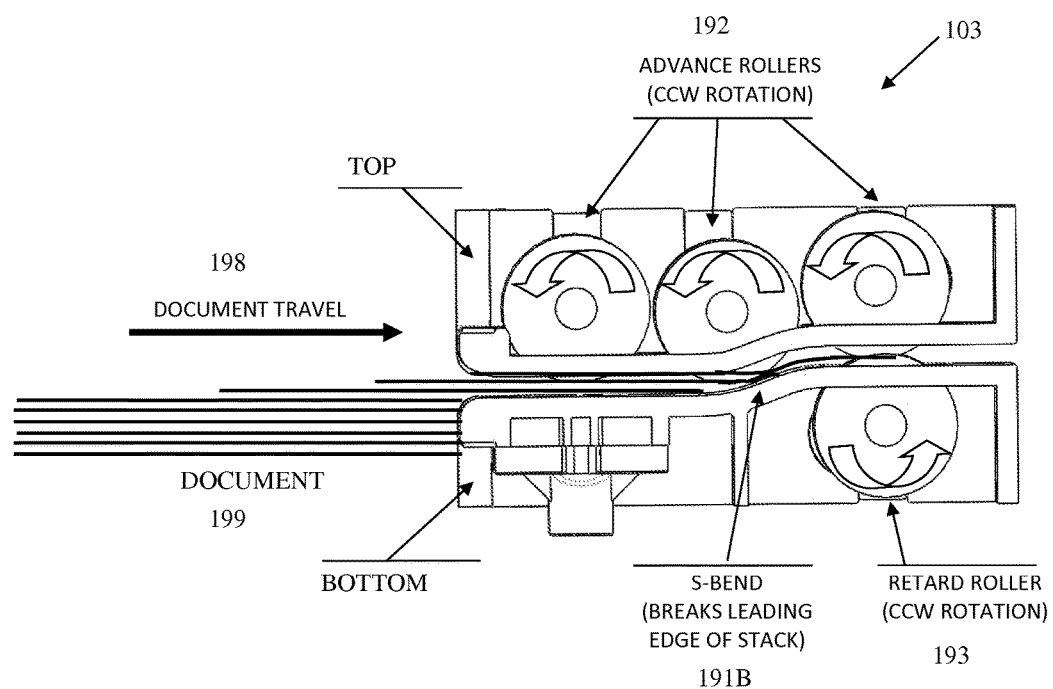
FIG. 1D is a diagram depicting a side view of an alternative upward s-bend in the two-phase media separator from that which was shown in the FIG. 1C, according to an example embodiment.

It is also noted that also some dimensions and measurements are illustrated with the discussions of the FIGS. 1B-1D, these dimensions and measurements may be altered without departing from the novel teachings presented herein for two-phase media separation within a value media depository.

FIG. 1B is a diagram depicting a front view of the two-phase media separator 103 from the FIG. 1A, according to an example embodiment.

The FIG. 1B shows the entrance to the bottom feed s-bend media separator 103 (two-phase media separator 103) showing just those components necessary for comprehending the various embodiments presented herein. It is noted that the media separator 103, in some embodiments, can be rotated upside down from the view shown and oriented for a top feed depository 100. The orientation presented for the FIG. 1B is for a bottom feed depository 100.

The s-bend media separator 103 is now discussed in greater detail with reference to the FIGS. 1C and 1D.

FIG. 1C is a diagram depicting a side view of a downward s-bend in the two-phase media separator 103 (s-bend separator 103) from the FIG. 1B, according to an example embodiment.

The s-bend separator 103 introduces a two-phase media separation integrated within a value media depository 100.

The first phase (may also be referred to as "first stage" herein) is a passive phase that is driven by modifying the value media transport path to include an s-bend 191A as the document 199 (value media 199) moves through the s-bend separator 103 from the first passive phase to an active second phase. The first phase begins when a stack of documents 199 engage the access mouth 101 of the depository 100 and the stack is urged along transport path 102 away from the access month 101. The second phase begins after the s-bend 191A (where the transport path 102 levels off after the s-bend 191A.

The first phase of separation proceeds as follows. The stack of documents 199 are engaged by the transport path 102 after being inserted through the access mouth 101 and begin transport, via the advance rollers 192), along the transport path 102. During initial transport, the stack of documents 199 encounter the s-bend 191A (downward bend in the transport path 102), which breaks (separates) a front edge of the stack causing the stack of documents 199 to splay or fan out and separate from one another along the curve of the s-bend 191A. The s-bend 191A forces a separation in the stack of documents 199 with the top set of documents 199 being held back while documents 199 on the bottom (for the downward s-bend 191A embodiment) are driven forward with the advance rollers 192 so that the second phase (stage of separation) has fewer documents 199 from the stack to deal with simultaneously. Essentially, the first phase breaks a leading edge of the stack to provide a leading first document 199 from the stack to the second phase.

The second phase of separation begins after the initial splaying of documents 199 from the stack (and where the s-bend 191A curve stops and the transport path 102 horizontally levels off. The second phase of separation is an active phase meaning documents 199 are separated from the stack for continued transport along the transport path 102 within the depository 100. In the second phase, includes a set of offset rollers (retard rollers 193 and advance rollers 192 rotating in opposite directions from one another) that pinch the documents 199 driving or urging a bottom document 199 from the stack forward while holding the remaining documents 199 from the stack back.

The s-bend 191A causes the shortest path along the transport path 102 to be the path of the bottom document 199 in the stack (similar visually to a track where the inside lane is the least distance for making a loop around the track). This shortest path caused by the s-bend 191A also creates a curling motion with the stack, which breaks the friction bonds between the documents 199 of the stack. One of ordinary skill in the art will appreciate that braking the friction bonds between documents in a stack is one of the most difficult things to achieve when separating documents from a stack within a depository.

The s-bend 191A creates a pre-separation track for the stack of documents 199 within the transport path 102 of the depository 100.

It is to be noted that any second phase separation process and/or apparatus may be used without departing from the novel first phase structure and process described herein.

In an embodiment, the drop in the transport path 102 for the s-bend 191A is approximately 3 mm.

In an embodiment, the length of the transport path 102 track present in the s-bend 191A is dependent on the length of the manufactured drop in the s-bend 191A.

FIG. 1D is a diagram depicting a side view of an alternative upward s-bend 191B in the two-phase media separator 103 from that which was shown in the FIG. 1C, according to an example embodiment.

FIG. 1D shows a reverse (upside down) orientation of the media separator 103 from that which was shown in the FIG. 1C.

Here, a stack of documents 100 travels 198 along the transport path 102 such that the novell upward s-bend 191B permits a top document 199 to be pre-separated from the stack prior to reaching the second phase of document separation at the advance rollers 192 and the retard roller 193.

In an embodiment, the length of a rise in the upward s-bend 191B is approximately 3 mm.

In an embodiment, the length of the transport path 102 track present in the s-bend 191B is dependent on the length of the manufactured drop in the s-bend 191B.

In an embodiment, the depository 100 having the novell two-phase separator 103 is integrated into a SST as a peripheral device of that SST. In an embodiment, the SST is an ATM; in an embodiment the SST is a kiosk.

In an embodiment, the depository 100 having the novell two-phase separator 103 is integrated into a Point-Of-Sale (POS) terminal as a peripheral device of that POS terminal.

These and other embodiments are now discussed with reference to the FIGS. 2-4.

Figure 2:
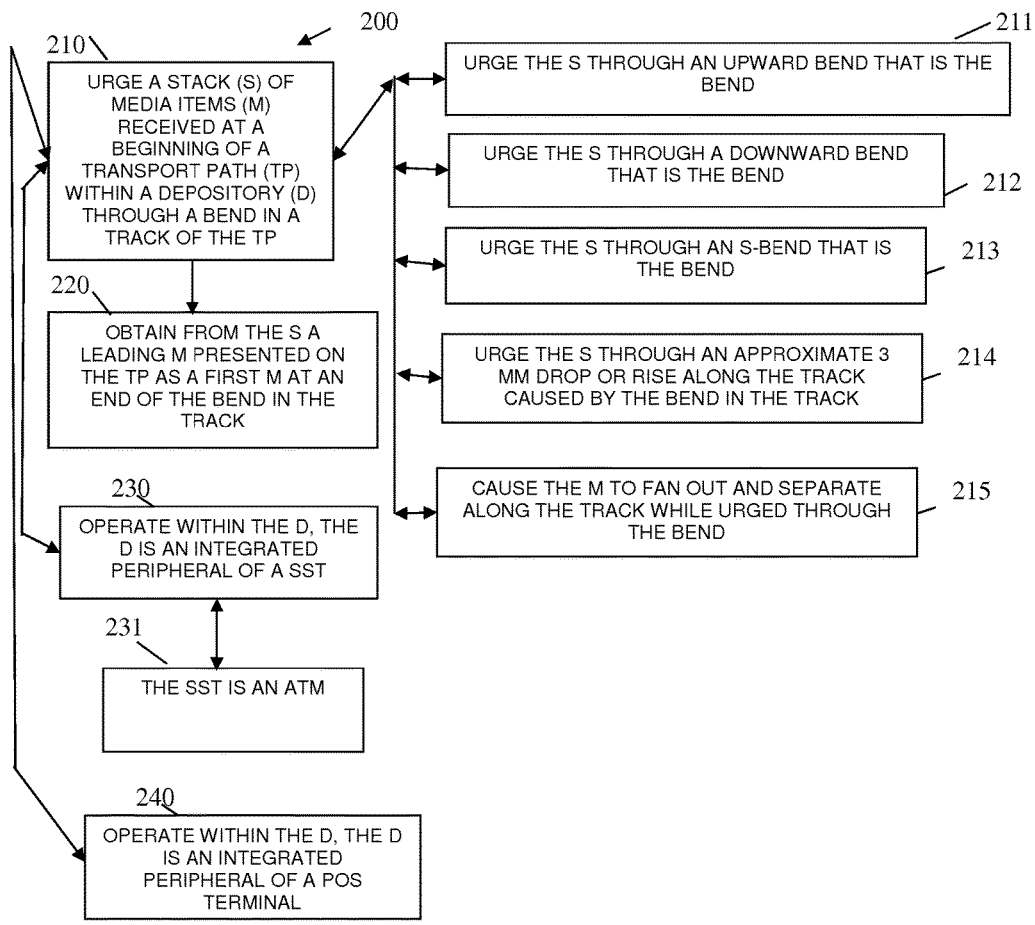
FIG. 2 is a diagram of a method for a two-phase media separation within a media depository, according to an example embodiment.

FIG. 2 is a diagram of a method for a two-phase media separation within a media depository, according to an example embodiment. The method 200 is operated by a value media depository as a value media separator within the value media depository.

In an embodiment, the method 200 is performed by the separator 103 of the FIG. 1C.

In an embodiment, the method 200 is performed by the separator 103 of the FIG. 1D.

In an embodiment, the media depository is the media depository 100 of the FIG. 1A.

In an embodiment, the media depository is a deposit module.

In an embodiment, the media depository is a recycler module.

In an embodiment, the media depository is a peripheral device integrated into an SST. In an embodiment, the SST is an ATM. In an embodiment, the SST is a kiosk.

In an embodiment, the media depository is a peripheral device integrated into a Point-Of-Sale (POS) terminal.

At 210, a stack of media items are received at a beginning of a transport path within the media depository and are urged along the transport path through a bend in a track of the transport path.

In an embodiment, the stack of media items are received at an infeed mouth 101 on a transport path 102 by a two-phase media separator 103 (as described above with reference to the FIGS. 1A-1D).

According to an embodiment, at 211, the stack is urged through an upward bend as shown and discussed above with reference to the FIG. 1D.

In an embodiment, at 212, the stack is urged through a downward bend as shown and discussed above with reference to the FIG. 1C.

In an embodiment, at 213, the stack is urged through an s-bend as shown and discussed above with reference to the FIGS. 1B-1D.

According to an embodiment, the stack is urged though an approximate 3 mm drop or rise along the track caused by the bend in the track.

In an embodiment, at 214, the media items of the stack are caused to at least partially fan out and separate along the track while being urged through the bend.

At 220, a leading media item is obtained as a first media item that is presented along the transport path at an end of the bend in the track.

In an embodiment, at 230, the method 200 is operated within the depository where the depository is an integrated peripheral of a SST. In an embodiment, at 231, the SST is an ATM.

In an embodiment, at 240, the method 200 is operated within the depository where the depository is an integrated peripheral of a POS terminal.

It is noted that the method 200 provides a two stage or phase media separation within a depository, the first stage 210 and the second stage 220. The first stage 210 pre-separates the media items from the stack when driving the stack through the bend of the track. The second stage 220 is presented with a first media item for urging along the transport path for additional processing within the depository (such as the additional processing discussed above with reference to the discussion of the FIG. 1A).

Figure 3:
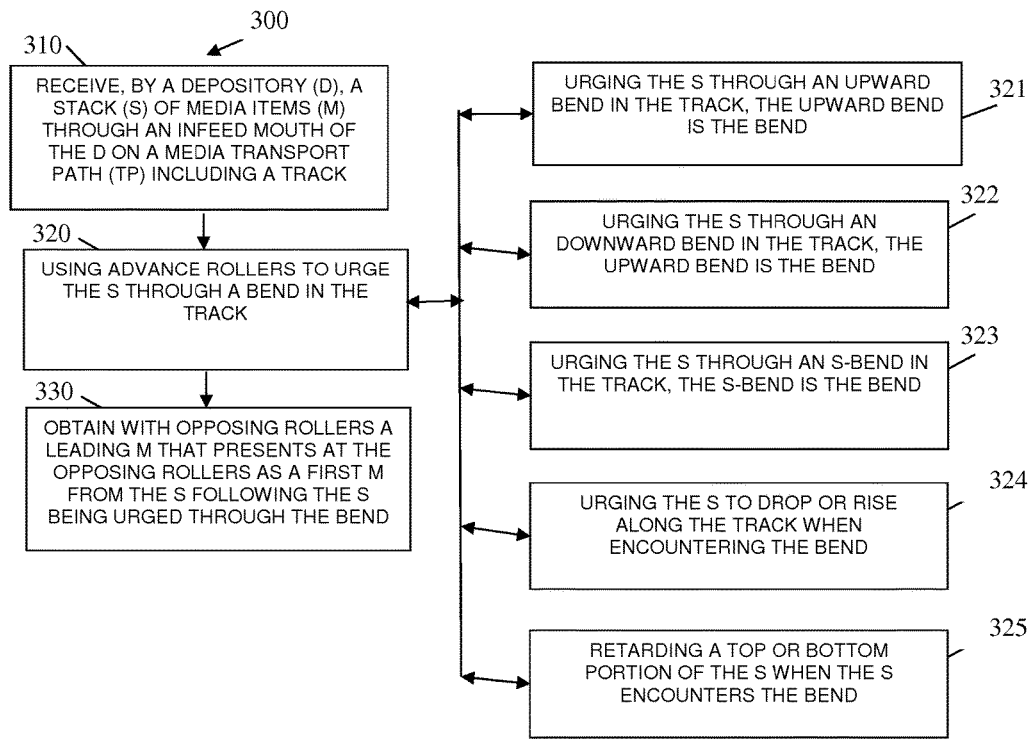
FIG. 3 is a diagram of another method for a two-phase media separation within a media depository, according to an example embodiment.

FIG. 3 is a diagram of another method 300 for a two-phase media separation within a media depository, according to an example embodiment. The method 300 is operated by a value media depository as a value media separator within the value media depository.

In an embodiment, the method 300 is performed by the separator 103 of the FIG. 1C.

In an embodiment, the method 300 is performed by the separator 103 of the FIG. 1D.

In an embodiment, the media depository is a deposit module.

In an embodiment, the media depository is a recycler module.

In an embodiment, the media depository is the media depository 100 of the FIG. 1A.

In an embodiment, the media depository is a peripheral device integrated into an SST. In an embodiment, the SST is an ATM. In an embodiment, the SST is a kiosk.

In an embodiment, the media depository is a peripheral device integrated into a Point-Of-Sale (POS) terminal.

In an embodiment, the method 300 presents another and in some ways enhance perspective of the processing depicted in the method 200 (presented above with the discussion of the FIG. 2).

At 310, the depository receives a stack of media items through an infeed mouth of the depository on a media transport path that includes a track.

In an embodiment, the depository is depository 100, the infeed mouth is the infeed mouth 101, and the media transport path is the transport path 102 of the FIG. 1A.

At 320, advance rollers of the depository urge the stack through a bend in the track.

In an embodiment, at 321, the stack is urged through an upward bend in the track, such as what is shown in the FIG. 1D above.

In an embodiment, at 322, the stack is urged through a downward bend in the track, such as what is shown in the FIG. 1C above.

In an embodiment, at 323, the stack is urged through an s-bend in the track, such as what is shown in the FIGS. 1B-1D.

In an embodiment, at 324, the stack is urged to drop or rise along the track when encountering the bend, as discussed above with reference to the FIGS. 1B-1D and FIG. 2.

In an embodiment, at 325, a top portion or bottom portion of the stack is retarded when the stack encounters the bend, as shown in the FIGS. 1C-1D.

At 330, opposing rollers obtain a leading media item from the stack where the leading media item presents itself at the opposing rollers as first media item from the stack following the stack being urged through the bend.

320 represent a first stage of separation while 330 represents a second stage of separation.

Figure 4:
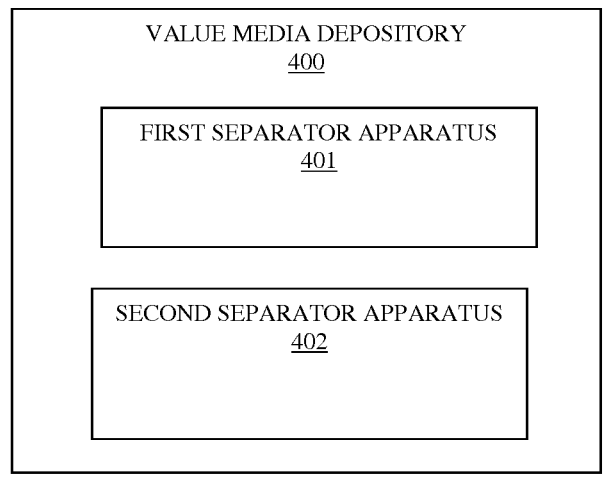
FIG. 4 is a media depository with a two-phase media separation, according to an example embodiment.

FIG. 4 is a media depository 400 with a two-phase media separation, according to an example embodiment. The value media depository 400 processes value media and includes a variety of mechanical and electrical components, some of which were discussed above with reference to the FIGS. 1A-1D.

In an embodiment, the value media depository 400 is a deposit module.

In an embodiment, the value media depository 400 is a recycler module.

In an embodiment, the value media depository 400 is the depository 100 of the FIGS. 1A-1D.

In an embodiment, the value media depository 400 is the depository that performs the method 200 of the FIG. 2.

In an embodiment, the value media depository 400 is the depository that performs the method 200 of the FIG. 3.

In an embodiment, the value media depository 400 is a peripheral device integrated into an SST. In an embodiment, the SST is an ATM. In an embodiment, the SST is a kiosk.

In an embodiment, the value media depository 400 is a peripheral device integrated into a Point-Of-Sale (POS) terminal.

The value media depository 400 includes a first separator apparatus 401 and a second separator apparatus 402.

The first separator apparatus 401 includes a first portion of a track that bends at an end of that first portion of the track (as shown in the FIGS. 1C and 1D. The first separator apparatus 401 is configured for performing a first phase of a two-phase media separation when a stack of media items are presented on the track at an infeed mouth of the value media depository 400. A beginning of the first portion of the track appearing at the infeed mouth of the value media depository 400.

In an embodiment, the first separator apparatus 401 is a transport path manufactured with a track that includes a bend or drop. In an embodiment, the bend or drop is the s-bend 191A of the FIG. 1C. In an embodiment, the bend or drop is the s-bend 191B of the FIG. 1D. In an embodiment, the length of the drop is approximately 3 mm.

In an embodiment, the bend is a rise or fall in the track along the first portion of the track.

The second separator apparatus 402 includes a second portion of the track. The second portion begins following the complete bend and the end of the first portion of the track (the first portion of the track included in the first separator apparatus 401). The second separator apparatus 402 is configured for performing a second phase of a two-phase media separation by obtaining on the second portion of the track a first leading media item that is presented first to the second separator apparatus 402 at the end of the first portion of the track following handling of the stack of media items along the track by the first separator apparatus 401.

The first separator apparatus 401 and the second separator apparatus 402 combine to form a two-phase separator 103 within the value media depository 400.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

urging a stack of media items received at a beginning of a transport path within a depository through a bend in a track of the transport path causing separation of the media items within the stack as the stack is urged through the bend, wherein urging further includes urging the stack through a first advance roller to the bend, urging the stack through bend by a second advance roller situated at the bend, and urging the stack past the bend by a third advance roller that is directly opposed on an opposite side of the track by a retard roller, the third advance roller is driven in a first direction while the retard roller is driven in a second opposite direction from the first direction, wherein the transport path urges the stack by the first, second, and third advance rollers situated on a first side of the track that are rotating in the first direction while a retard roller situated on a second side of the track is driven and rotated in the second opposite direction from the first direction, wherein the bend includes the second advance roller and the bend does not include the retard roller or any other retard roller, and receiving the media items as the media items are being moved along the transport path when received within the depository and continuously urging and moving the media items through the bend along the transport path within the depository;

obtaining from the stack a leading media item presented on the transport path as a first media item at an end of the bend in the track at a location where the third advance roller and the retard roller are situated along the track; and operating the method within the depository, wherein the depository is an integrated peripheral of a terminal, and wherein operating the depository as a two-phase media separator with the bend and selective activation and deactivation of the advance rollers and the retard roller.

2. The method of claim 1, wherein urging further includes urging the stack through an upward bend that is the bend.

3. The method of claim 1, wherein urging further includes urging the stack through a downward bend that is the bend.

4. The method of claim 1, wherein urging further includes urging the stack through an s-bend that is the bend.

5. The method of claim 1, wherein urging further includes urging the stack through an approximate 3 mm drop or rise along the track caused by the bend in the track.

6. The method of claim 1, wherein urging further includes causing the media items to fan out and separate along the track while urged through the bend.

7. The method of claim 1 further comprising, operating the method within the depository, wherein the terminal is a Self-Service Terminal (SST).

8. The method of claim 7, wherein the SST is an Automated Teller Machine (ATM).

9. A method, comprising:

receiving, by a depository, a stack of media items through an infeed mouth of the depository on a media transport path including a track;

using advance rollers that are rotating in a first direction on a first side of the track to urge the stack and continuously move the stack along the transport path and through a bend in the track, wherein using further includes advance the stack along the transport path by a first advance roller to a second advance roller situated at the bend and further along the transport path following the bend to a third advance roller that is directly opposed on an opposite side of the track by a retard roller, wherein the first advance roller, the second advance roller, and the third advance roller are driven in the first direction; and obtaining by the retard roller that is driven and is rotating in a second and opposite direction from the first direction, a leading media item that presents at the retard roller as a first media item from the stack after the stack was urged though the bend with the media items being separated while being urged through the bend in the track, and wherein the bend includes the second advance roller and the bend lacks the retard roller or any other retard rollers, and wherein operating the depository as a two-phase media separator with the bend and selective activation and deactivation of the advance rollers and the opposing retard rollers.

10. The method of claim 9, wherein using further includes urging the stack through an upward bend in the track, wherein the upward bend is the bend.

11. The method of claim 9, wherein using further includes urging the stack through a downward bend in the track, wherein the downward bend is the bend.

12. The method of claim 9, wherein using further includes urging the stack through an s-bend in the track, wherein the s-bend is the bend.

13. The method of claim 9, wherein using further includes urging the stack to drop or rise along the track when encountering the bend.

14. The method of claim 13, wherein urging further includes retarding a top or bottom portion of the stack when the stack encounters the bend.

15. A depository, comprising:
- a first separator apparatus including a first portion of a track that bends at an end of that first portion of the track; and
- a second separator apparatus including a second portion of the track that begins following the bend and the end of the first portion of the track;
- wherein when a stack of media items is urged along the first portion of track by a first advance roller situated on a first side of the track, the media items are fanned out and separated through the bend and urged along the track by driving a second advance roller at the bend, after the bend a first leading media item is exposed and presented to the second separator apparatus, the second separator apparatus includes a third advance roller situated on the first side of the track and a retard roller that directly opposes the third advance roller on a second and opposite side of the track, and wherein the bend includes the second advance roller that is driven and is rotating in a first direction and lacks the retard roller or any other opposing retard roller, the retard roller is driven and is rotated in a second opposite direction from the first direction along the track and the stack of media items are moving when received at the first portion and continue moving through the second portion, and wherein depository is configured to operate as a two-phase media separator.

16. The depository of claim 15, wherein the bend is a rise or fall in the track along the first portion of the track.

17. The depository of claim 15, wherein the bend is an s-bend along the first portion of track.

18. The depository of claim 15, wherein the bend is approximately a 3 mm rise or fall in the track along the first portion of the track.

19. The depository of claim 15, wherein the depository is one of:
- a deposit module and a recycler module.

* * * * *